United States Patent
Lin et al.

(10) Patent No.: US 6,937,468 B2
(45) Date of Patent: Aug. 30, 2005

(54) PORTABLE COMPUTER AND PORTABLE DOCKING STATION ARRANGEMENT

(75) Inventors: Chin-Jen Lin, Taipei (TW); Kao-Wen Chang, Taipei (TW); Ming-Hsun Yang, Taipei (TW); Tzu-Wei Lai, Taipei (TW)

(73) Assignee: Tatung Co., Ltd., Taipei (TW)

( * ) Notice: Subject to any disclaimer, the term of this patent is extended or adjusted under 35 U.S.C. 154(b) by 0 days.

(21) Appl. No.: 10/788,376

(22) Filed: Mar. 1, 2004

(65) Prior Publication Data

US 2005/0111182 A1   May 26, 2005

(30) Foreign Application Priority Data

Nov. 20, 2003   (TW) .............................. 92220547 U (51) Int. Cl.[7] .............................................. G06F 1/16
(52) U.S. Cl. ................... 361/686; 710/304; 435/286.1; 364/708.1
(58) Field of Search ................................ 361/683–687, 361/724–727, 691; 710/303–304; 435/289.1, 435/286.5, 297.2; 439/347, 352; 364/708.4; 713/322–324

(56) References Cited

U.S. PATENT DOCUMENTS

| 6,625,015 B2 * | 9/2003 | Yin .............................. 361/686 |
| 2003/0095379 A1 * | 5/2003 | Fujiki et al. ................. 361/686 |
| 2004/0057204 A1 * | 3/2004 | Yin et al. ..................... 361/686 |

* cited by examiner

*Primary Examiner*—Hung Van Duong
(74) *Attorney, Agent, or Firm*—Bacon & Thomas PLLC (57) ABSTRACT

A portable computer and portable docking station arrangement includes a portable docking station equipped with a keyboard, a swinging bracket pivoted to the portable docking station, and a portable computer insertable into the swinging bracket in one of two reversed directions for enabling the arrangement to be used as a notebook computer or a tablet PC. A spare battery pack is provided at the portable docking station, and chargeable by external power supply upon insertion of the portable computer into the swinging bracket. Data transmission between the portable docking station and the portable computer may be achieved by a wired transmission method or wireless transmission method.

9 Claims, 9 Drawing Sheets

PORTABLE COMPUTER AND PORTABLE DOCKING STATION ARRANGEMENT

BACKGROUND OF THE INVENTION

1. Field of the Invention

The present invention relates to a portable computer and docking station arrangement and, more particularly, to a portable computer and portable docking station arrangement that can be alternatively arranged into two different forms for use as a notebook computer or a portable computer.

2. Description of Related Art

A notebook computer and a portable computer (for example, tablet PC) have different ways of use. A user may select a notebook computer or portable computer subject to individual demand. Further, a notebook computer and a portable computer may be used with a docking station having connection port means.

A conventional docking station is designed for use in a fixed place. When in use, a docking station must be connected to external power supply to obtain the necessary electricity. Therefore, conventional docking stations cannot be used as portable electronic apparatus. Further conventional docking stations have only connection port means; however they are not equipped with a keyboard for data input. When using a docking station with a notebook computer, the user shall have to use a connection cable to connect an external keyboard to the connection port means of the docking station for use with the notebook computer or portable computer if he (she) does not want to use the keyboard of the notebook computer.

Further, conventional docking stations do not provide a battery charging function. When loading a notebook computer or portable computer in a docking station, the user needs to connect the docking station to external power supply to obtain the necessary electricity.

SUMMARY OF THE INVENTION

The present invention has been accomplished under the circumstances in view. It is the main object of the present invention to provide a portable computer and portable docking station arrangement, which can alternatively be used as a notebook or a portable computer as desired. It is another object of the present invention to provide a portable computer and portable docking station arrangement, which automatically charges the battery pack during the operation. To achieve these and other objects of the present invention, the portable computer and portable docking station arrangement comprises a portable docking station, a swinging bracket, and a portable computer. The portable docking station comprises a keyboard disposed at a top side thereof, and two pivoting devices axially aligned at a rear part of the top side. The swinging bracket comprises two pivoting devices, and a receiving open chamber, the two pivoting devices disposed coaxially at two opposite lateral sides thereof and respectively pivoted to the pivoting devices of the portable docking station for enabling the swinging bracket to be rotated relative to the portable docking station, and the receiving open chamber adapted to receive the portable computer. The portable computer comprises a display screen disposed at a front side thereof. When in use, the portable computer is inserted into the receiving open chamber of the swinging bracket with the display screen facing the keyboard of the portable docking station. At this time, the arrangement is used as a notebook computer, and the portable computer can be rotated with the swinging bracket relative to the portable docking station to the desired angle. After removal of the portable computer from the swinging bracket, the portable computer can rotated through 180° and then inserted into the receiving open chamber of the swinging bracket with the back side of the display screen facing the keyboard of the portable docking station. At this time, the arrangement is used as a portable computer. Therefore, the invention can be used as a notebook computer or a portable computer as desired.

Further, the swinging bracket comprises at least one connection port disposed in the receiving open chamber; the portable computer comprises at least one electric connector disposed at a bottom side thereof for electrical connection to the at least one connection port of the swinging bracket upon insertion of the portable computer into the receiving open chamber of the swinging bracket. Alternatively, data transmission between the portable computer and the portable docking station can be done by means of a wireless transmission method, i.e., the portable docking station is provided with a first wireless transmission apparatus and the portable computer is provided with a second wireless transmission apparatus for wireless data transmission with the first wireless transmission apparatus.

Further, the portable docking station is provided with a spare battery pack. When inserted the portable computer into the swinging bracket for use with the portable docking station, the spare battery pack is charged by electricity from external power supply at the same time. The spare battery pack can be electrically connected to the at least one connection port in the receiving open chamber of the swinging bracket for providing electricity to the portable computer upon insertion of the portable computer into the swinging bracket. Therefore, the user can carry the portable docking station with the portable computer for use at different places.

DETAILED DESCRIPTION OF THE PREFERRED EMBODIMENT

Figure 1:
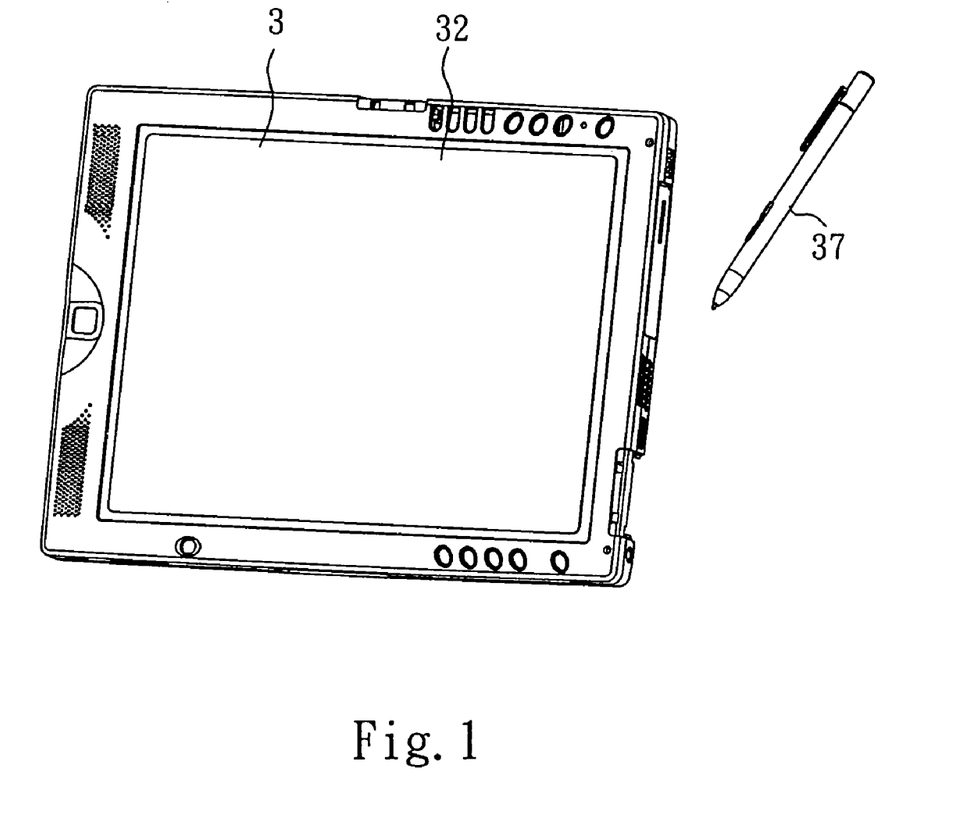
FIG. 1 is a schematic drawing showing a status of use of the first embodiment of the present invention without the use of the portable docking station.

Referring to FIG. 1, a portable computer and portable docking station arrangement in accordance with the first embodiment comprises a portable computer 3. According to this embodiment, the portable computer 3 is a tablet PC, having a display screen 32 on the front side. Under normal status of use, a touch pen 37 is used for input operation.

Figure 2:
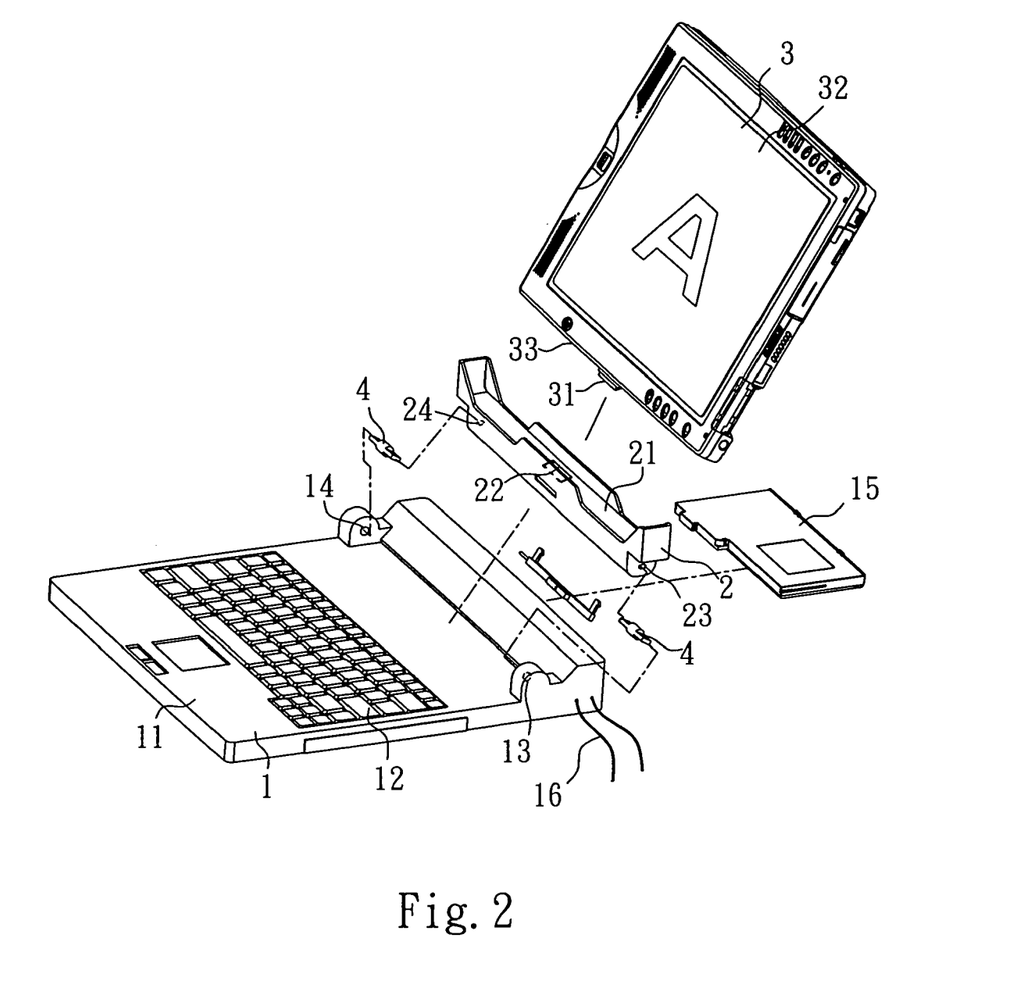
FIG. 2 is an exploded view of the first embodiment of the present invention.

Referring to FIG. 2, in addition to the aforesaid portable computer 3, the portable computer and portable docking station arrangement further comprises a portable docking station 1, and a swinging bracket 2. The portable docking station 1 is connectable to external power supply (not shown) by a power cable 16, having a keyboard 12 provided at the top side 11, and two first pivoting means 13 and 14 coaxially aligned near the rear side. According to this embodiment, the first pivoting means 13 and 14 are pivot holes.

The swinging bracket 2 comprises two second pivoting means 23 and 24 symmetrically disposed coaxially at two opposite lateral sides. According to this embodiment, the second pivoting means 23 and 24 are also pivot holes. Two pivots 4 are respectively connected between the first pivoting means 13 and 14 and the second pivoting means 23 and 24 to pivotally secure the swinging bracket 2 to the portable docking station 1, for enabling the swinging bracket 2 to be rotated about the axis extending through the first pivoting means 13 and 14 relative to the portable docking station 1. The swinging bracket 2 further comprises a receiving open chamber 21, and a connection port 22 set in the receiving open chamber 21 at the center for data transmission.

Figure 3:
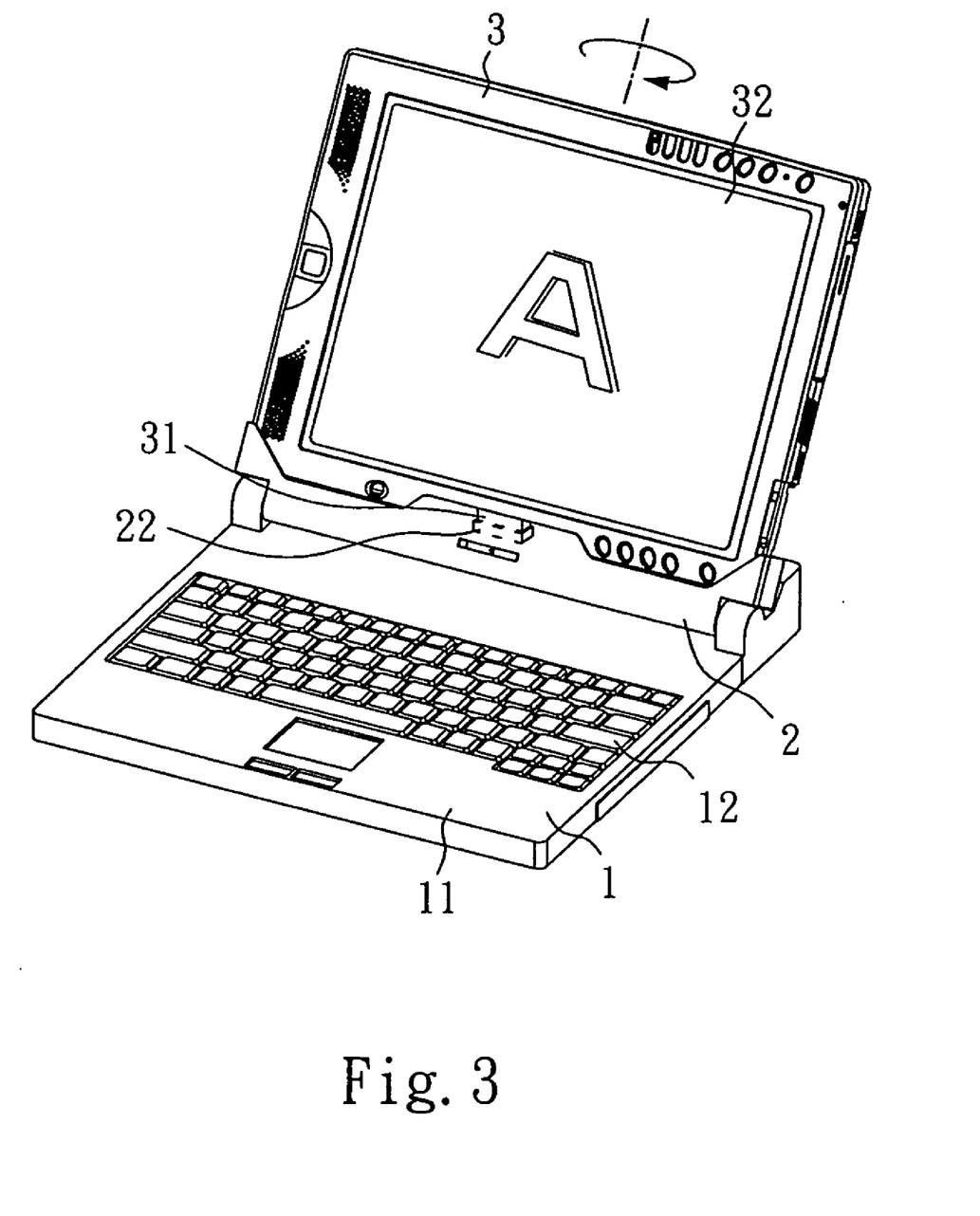
FIG. 3 is a schematic drawing showing the first embodiment arranged for use as a notebook computer.

Referring to FIGS. 2 and 3 again, an electric connector 31 is disposed at the center of the bottom side 33 of the portable computer 3. The bottom side 33 of the portable computer 3 fits the receiving open chamber 21 of the swinging bracket 2. The connection port 22 of the swinging bracket 2 is electrically connected to the internal circuit (not shown) of the portable docking station 1. When inserted the bottom side 33 of the portable computer 3 into the receiving open chamber 21 of the swinging bracket 2, the electric connector 31 of the portable computer 3 is electrically connected to the connection port 22 in the receiving open chamber 21 to achieve electric connection between the internal circuit of the portable computer 3 and the internal circuit of the portable docking station 1 for data transmission. After insertion of the portable computer 3 into the receiving open chamber 21 of the swinging bracket 2, the user can use the keyboard 12 of the portable docking station 1 to input data into the portable computer 3, and therefore the portable computer and portable docking station arrangement is used as a notebook computer.

Figure 4:
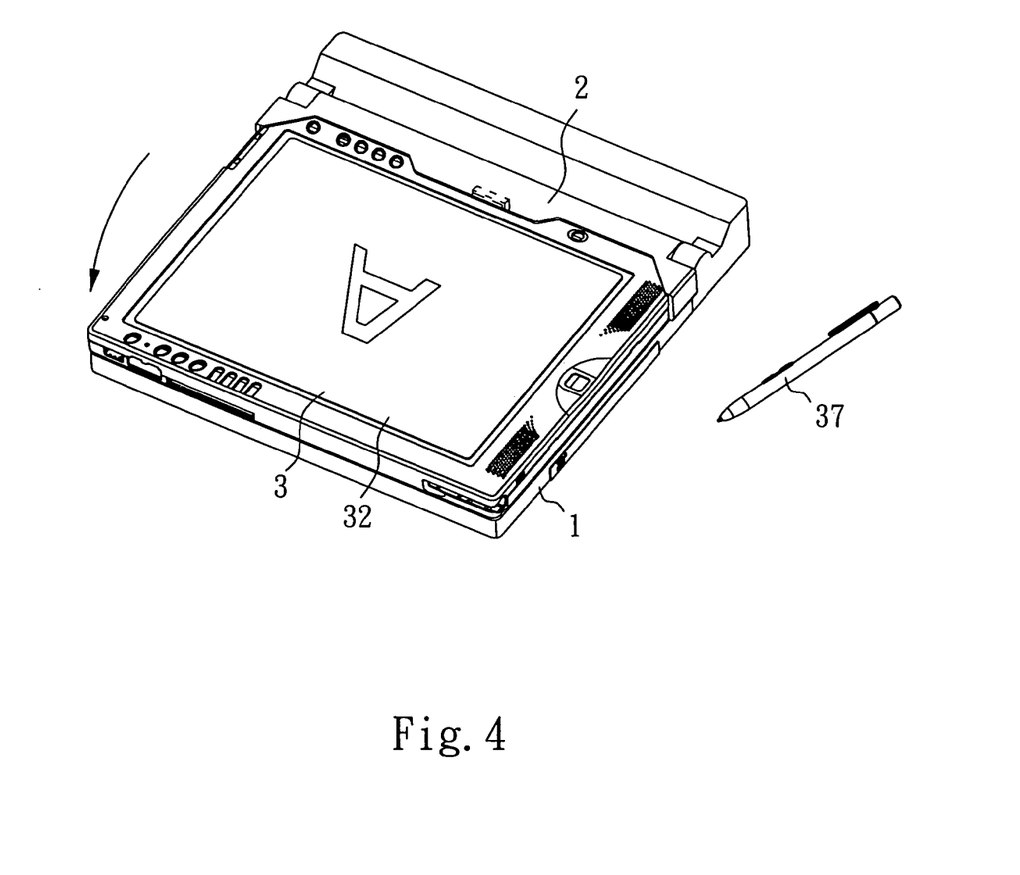
FIG. 4 is a schematic drawing showing the first embodiment arranged for use as a portable computer.

Referring to FIG. 4 and FIGS. 2 and 3 again, the portable computer and portable docking station arrangement can be used as a portable computer. For this operation mode, the portable computer 3 is detached from the swinging bracket 2 and then rotated horizontally through 180° (see the arrow shown in FIG. 3), and then the portable computer 3 is attached to the swinging bracket 2 again to have the back side of the display screen 32 facing the keyboard 12 of the portable docking station 1. After insertion of the portable computer 3 into the receiving open chamber 21 of the swinging bracket 2, the electric connector 31 of the portable computer 3 is electrically connected to the connection port 22 in the receiving open chamber 21, and the user can then rotated the portable computer 3 downwards with the swinging bracket 2 and closed on the top side of the portable docking station 1. At this time, the portable computer and portable docking station arrangement form a simple potable computer, and the user can use the touch pen 37 for input.

As indicated above, the portable computer 3 and the swinging bracket 2 are detachable, and the portable computer 3 can be rotated with the swinging bracket 2 relative to the portable docking station 1 that is equipped with a keyboard 12. Therefore, the whole assembly of the portable computer and portable docking station arrangement of the present invention can alternatively used as a notebook computer or a simple portable computer as desired. Further, the electric connector 31 of the portable computer 3 and the connection port 22 of the swinging bracket 2 are not limited to the center position. They can be respectively disposed near one lateral side biased from the center position and set corresponding to each other.

Referring to FIG. 2 again, a spare battery pack 15 may be installed in the portable docking station 1. During the use of the portable computer 3, the spare battery pack 15 can be charged with electricity from external power supply through the power cable 16 at the same time. The spare battery pack 15 can provide electricity to the portable computer 3; therefore, the user can carry the portable docking station 1 with the portable computer 3 for use at different places.

Figure 5:
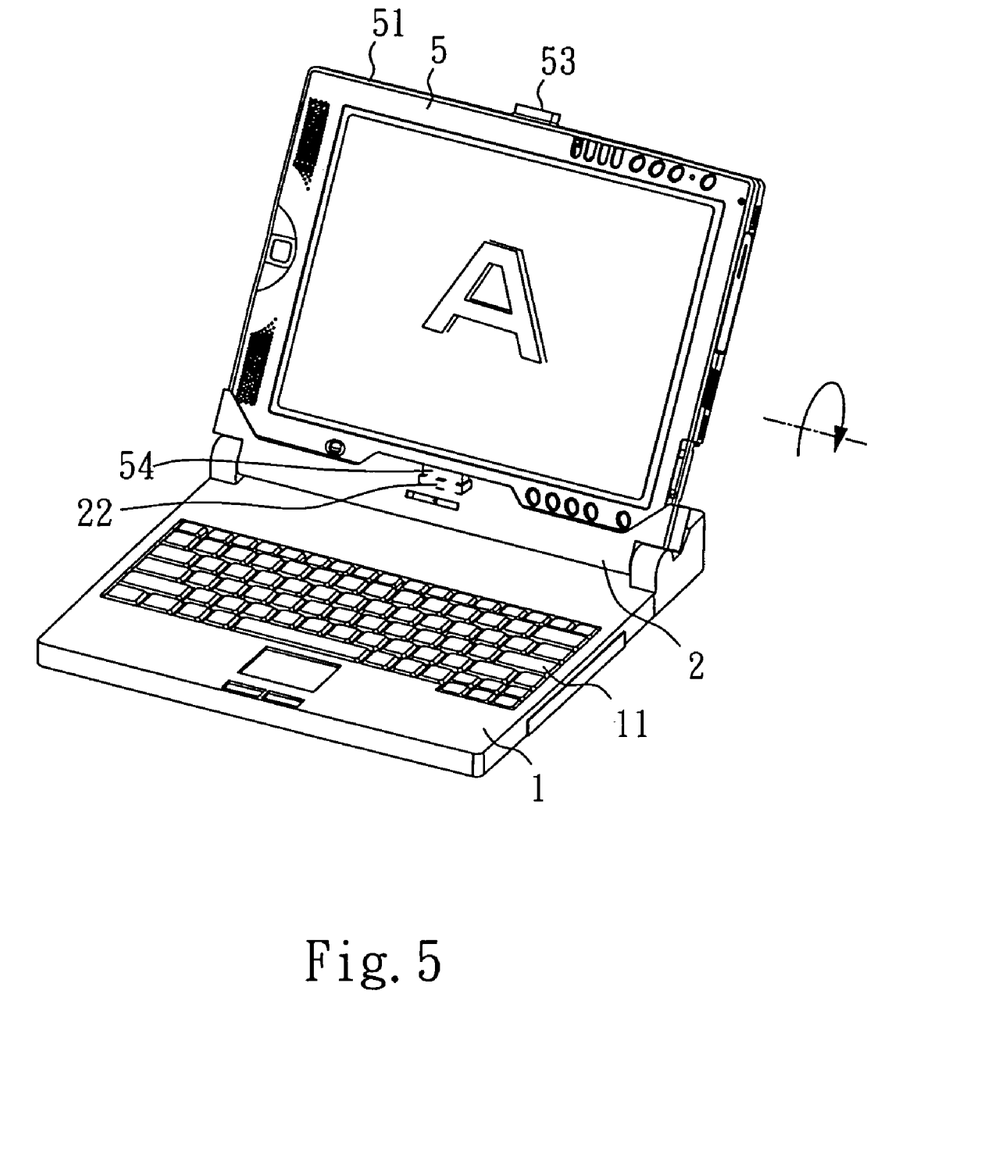
FIG. 5 is a schematic drawing showing the second embodiment arranged for use as a notebook computer.
Figure 6:
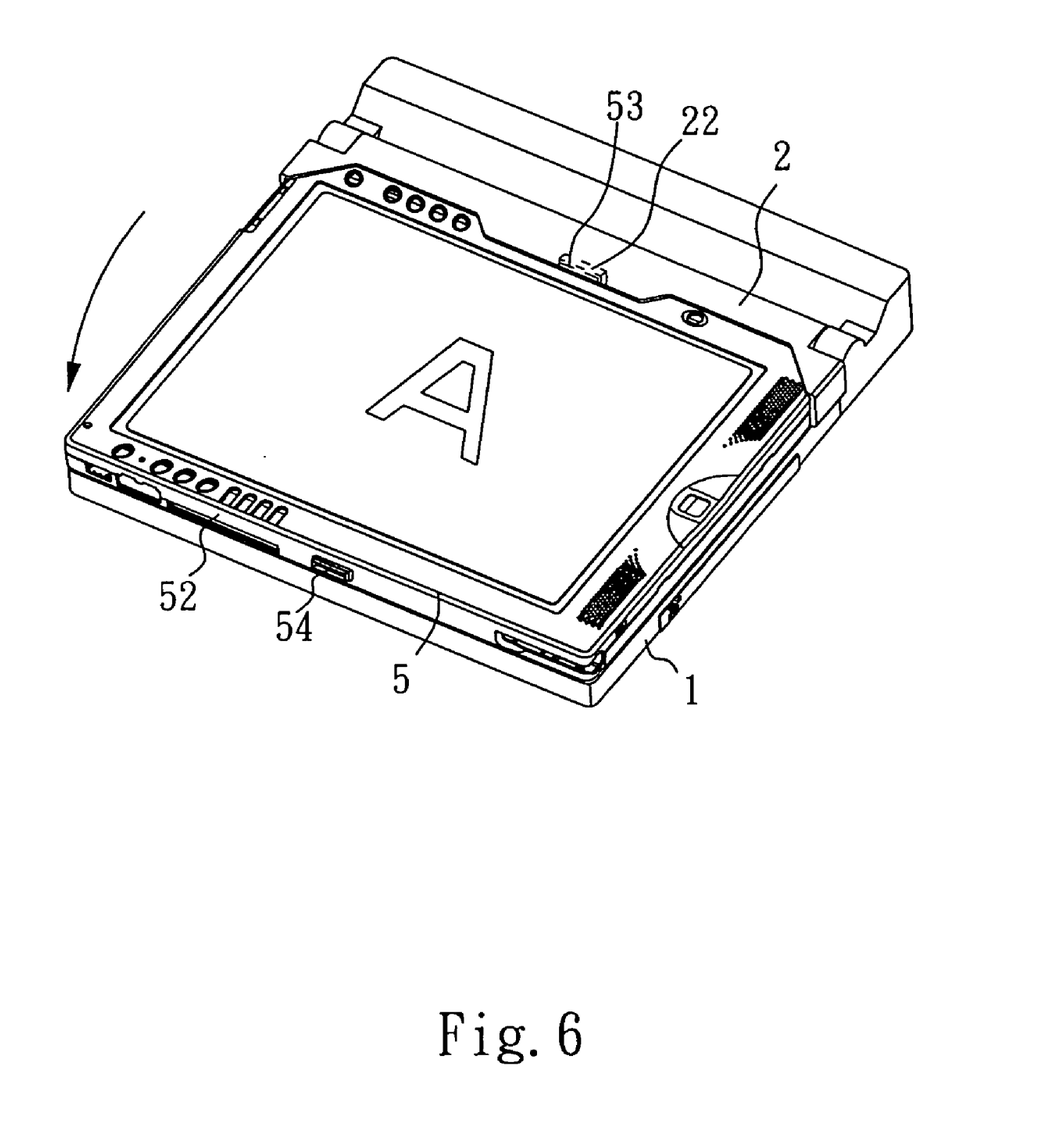
FIG. 6 is a schematic drawing showing the second embodiment arranged for use as a portable computer.

FIGS. 5 and 6 show a portable computer and portable docking station arrangement constructed according to the second embodiment of the present invention. This embodiment is similar to the aforesaid first embodiment with the exception that the portable computer 5 of this second embodiment comprises two electric connectors 53 and 54 respectively provided at the center of the top side 51 and the center of the bottom side 52. When using the portable computer and portable docking station arrangement as a notebook computer, one electric connector 54 is electrically connected to the connection port 22 of the swinging bracket 2 (see FIG. 5). Further, the user can rotate the portable computer 5 vertically through 180° and then connect another electric connector 53 of the portable computer 5 to the swinging bracket 2, enabling the portable computer and portable docking station arrangement to be simply used as a portable computer.

Figure 7:
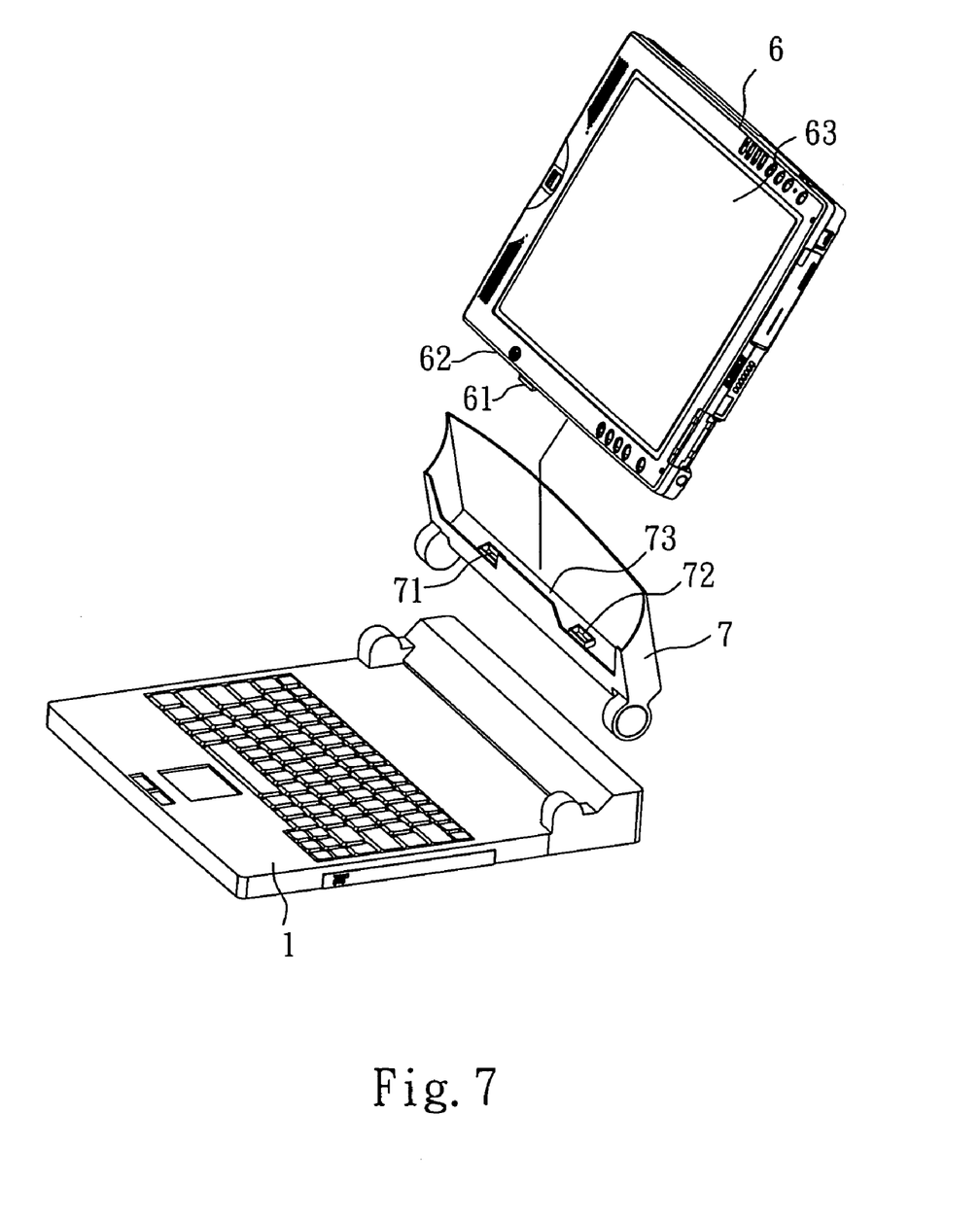
FIG. 7 is an exploded view of the third embodiment of the present invention.

FIG. 7 is an exploded view of a portable computer and portable docking station arrangement constructed according to the third embodiment of the present invention. According to this embodiment, the receiving open chamber 73 of the swinging bracket 7 is relatively deeper than the receiving open chambers of the aforesaid first and second embodiments. Further, the swinging bracket 7 comprises two connection ports 71 and 72 disposed in the receiving open chamber 73 and equally spaced from the center of the receiving open chamber 73 at two sides. The portable computer 6 comprises an electric connector 61 disposed at the bottom side 62 and spaced from the center of the bottom side 62 at one side. When inserted the bottom side 62 of the portable computer 6 into the receiving open chamber 73 with the front side of the display screen 63 facing the portable docking station 1, the electric connector 61 is connected to one connection port 71. When rotating the portable computer 6 horizontally through 180° and then inserted into the receiving open chamber 73 with the back side of the display screen 63 facing the portable docking station 1, the electric connector 61 is connected to the other connection port 72.

Figure 8:
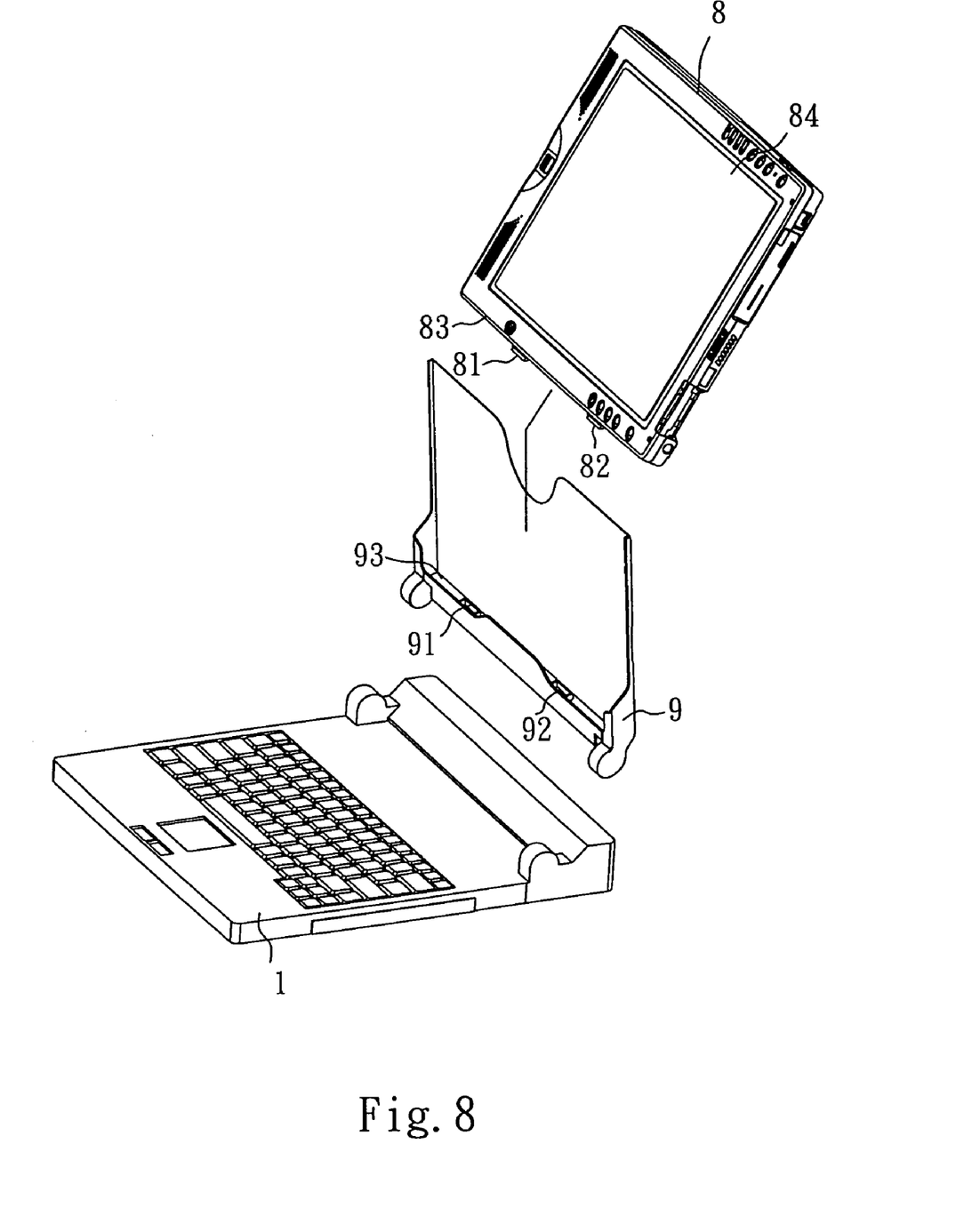
FIG. 8 is an exploded view of the fourth embodiment of the present invention.

FIG. 8 is an exploded view of a portable computer and portable docking station arrangement constructed according to the fourth embodiment of the present invention. According to this embodiment, the receiving open chamber 93 of the swinging bracket 9 is further deeper; the swinging bracket 9 comprises two connection ports 91 and 92 disposed in the receiving open chamber 93 and equally spaced from the center of the receiving open chamber 93 at two sides; the portable computer 8 comprises two electric connectors 81 and 82 disposed at the bottom side 83 corresponding to the connection ports 91 and 92 in the receiving open chamber 93. When inserted the bottom side 83 of the portable computer 8 into the receiving open chamber 93 with the front side of the display screen 84 facing the portable docking station 1, the electric connectors 81 and 82 are respectively connected to the connection ports 91 and 92 of the swinging bracket 9. When inserted the bottom side 83 of the portable computer 8 into the receiving open chamber 93 with the back side of the display screen 84 facing the portable docking station 1, the electric connectors 82 and 81 are respectively connected to the connection ports 91 and 92 of the swinging bracket 9.

According to the aforesaid embodiments of the present invention, the locations of the electric connectors at the portable computer and the connection ports in the receiving open chamber of the swinging bracket may be properly changed to fit different conditions of use.

Figure 9:
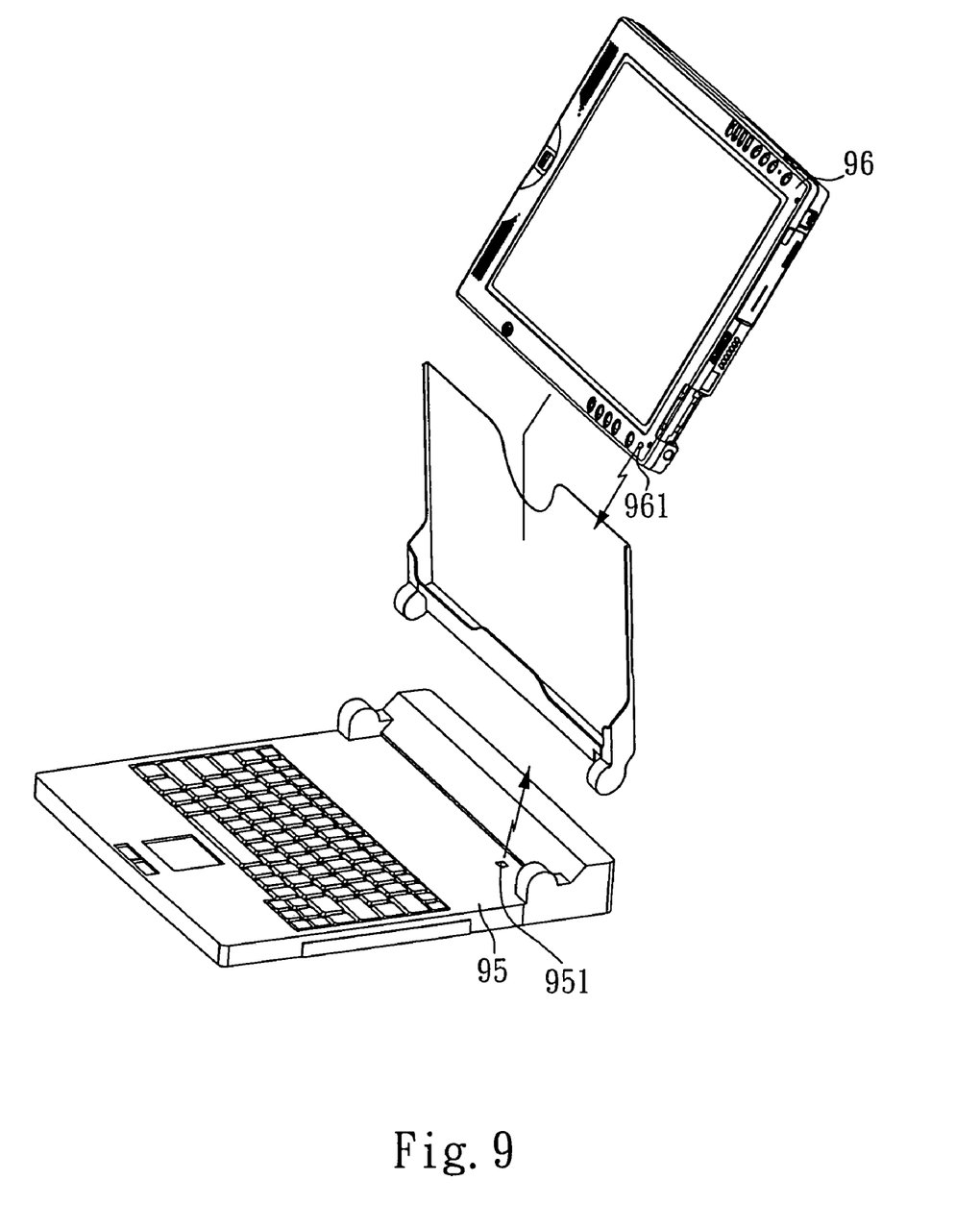
FIG. 9 is an exploded view of the fifth embodiment of the present invention.

FIG. 9 is an exploded view of a portable computer and portable docking station arrangement constructed according to the fifth embodiment of the present invention. According to this embodiment, data transmission between the portable computer 96 and the portable docking station 95 is achieved by means of a wireless transmission arrangement, i.e., a first wireless transmission apparatus 951 is provided at the portable docking station 95 and a second wireless transmission apparatus 961 is provided at the portable computer 96. The first wireless transmission apparatus 951 and the second wireless transmission apparatus 961 according to this embodiment are infrared transmission apparatus. Through these two infrared transmission apparatus, a wireless data transmission operation can be done.

A prototype of portable computer and portable docking station arrangement has been constructed with the features of FIGS. 1–9. The portable computer and portable docking station arrangement functions smoothly to provide all of the features discussed earlier.

Although particular embodiments of the present invention have been described in detail for purposes of illustration, various modifications and enhancements may be made without departing from the spirit and scope of the invention. Accordingly, the invention is not to be limited except as by the appended claims.

What is claimed is:

1. A portable computer and portable docking station arrangement comprising:
   a portable docking station, said portable docking station comprising a keyboard disposed at a top side thereof and two pivoting devices axially aligned at a rear part of the top side;
   a swinging bracket, said swinging bracket comprising two pivoting devices and a receiving open chamber, said two pivoting devices disposed coaxially at two opposite lateral sides thereof and respectively pivoted to the pivoting devices of said portable docking station for enabling said swinging bracket to be rotated relative to said portable docking station; and
   a portable computer insertable into the receiving open chamber of said swinging bracket, said portable computer having a display screen on a front side thereof.

2. The portable computer and portable docking station arrangement as claimed in claim 1, wherein said swinging bracket comprises at least one connection port disposed in said receiving open chamber; said portable computer comprises at least one electric connector disposed at a bottom side thereof for electrical connection to the at least one connection port of said swinging bracket upon insertion of said portable computer into the receiving open chamber of said swinging bracket.

3. The portable computer and portable docking station arrangement as claimed in claim 1, wherein said portable docking station further comprising a first wireless transmission apparatus, said portable computer further comprising a second wireless transmission apparatus for wireless data transmission with said first wireless transmission apparatus.

4. The portable computer and portable docking station arrangement as claimed in claim 1, wherein said portable computer is a tablet PC (personal computer).

5. The portable computer and portable docking station arrangement as claimed in claim 2, wherein the number of said at least one connection port of said swinging bracket is one, and the connection port of said swinging bracket is disposed in said receiving open chamber at the center; the number of the at least one electric connector at the bottom side of said portable computer is one, and the electric connector of said portable computer is disposed at the center of the bottom side of said portable computer corresponding to the connection port of said swinging bracket.

6. The portable computer and portable docking station arrangement as claimed in claim 2, wherein the number of said at least one connection port of said swinging bracket is one, and the connection port of said swinging bracket is disposed in said receiving open chamber near one side; the number of the at least one electric connector at the bottom side of said portable computer is one, and the electric connector of said portable computer is disposed at one lateral side of the bottom side of said portable computer corresponding to the connection port of said swinging bracket.

7. The portable computer and portable docking station arrangement as claimed in claim 3, wherein said first wireless transmission apparatus and said second wireless transmission apparatus are infrared transmission apparatus respectively.

8. The portable computer and portable docking station arrangement as claimed in claim 5, wherein said portable computer further comprises a top side insertable into the receiving open chamber of said swinging bracket, and a second electric connector disposed at the center of said top side and electrically connectable to the connection port in said receiving open chamber.

9. The portable computer and portable docking station arrangement as claimed in claim 6, wherein said portable computer comprises an another electric connector disposed at another lateral side of the bottom side of said portable computer symmetrically opposite to said electric connector and corresponding to the connection port of said swinging bracket, such that the bottom side of said portable computer is insertable into the receiving open chamber of said swinging bracket in one of two reversed directions for enabling one of said electric connector and said another electric connector to be electrically connected to the connection port of said swinging bracket.

\* \* \* \* \*